(12) United States Patent
Kim et al.

(10) Patent No.: US 12,323,463 B1
(45) Date of Patent: Jun. 3, 2025

(54) METHOD AND APPARATUS FOR DETECTING URL RELATED TO PHISHING SITE USING ARTIFICIAL INTELLIGENCE AND GENERATIVE AI ALGORITHM

(71) Applicant: NURILAB CO., LTD., Seoul (KR)

(72) Inventors: Jihun Kim, Uiwang-si (KR); Sunho Park, Incheon (KR)

(73) Assignee: NURILAB CO., LTD., Seoul (KR)

( * ) Notice: Subject to any disclaimer, the term of this patent is extended or adjusted under 35 U.S.C. 154(b) by 0 days.

(21) Appl. No.: 18/843,974

(22) PCT Filed: Sep. 26, 2023

(86) PCT No.: PCT/KR2023/014795
§ 371 (c)(1),
(2) Date: Sep. 4, 2024

(87) PCT Pub. No.: WO2025/023368
PCT Pub. Date: Jan. 30, 2025

(30) Foreign Application Priority Data

Jul. 24, 2023 (KR) .................. 10-2023-0095850

(51) Int. Cl.
*H04L 9/40* (2022.01)
*G06V 30/19* (2022.01)

(52) U.S. Cl.
CPC .... *H04L 63/1483* (2013.01); *G06V 30/19093* (2022.01)

(58) Field of Classification Search
CPC ................................................. H04L 63/1483
See application file for complete search history.

(56) References Cited

U.S. PATENT DOCUMENTS

| | | | |
|---|---|---|---|
| 10,404,723 B1 * | 9/2019 | Mushtaq | H04L 63/1425 |
| 11,757,914 B1 * | 9/2023 | Jakobsson | H04L 51/42 726/25 |
| 12,206,705 B2 * | 1/2025 | Kagan | G06N 3/08 |
| 2007/0233643 A1 * | 10/2007 | Kang | G06F 21/85 |
| 2008/0133540 A1 * | 6/2008 | Hubbard | H04L 63/145 |

(Continued)

FOREIGN PATENT DOCUMENTS

| | | |
|---|---|---|
| KR | 10-0516302 B1 | 9/2005 |
| KR | 10-2014-0017319 A | 2/2014 |

(Continued)

*Primary Examiner* — Khang Do
(74) *Attorney, Agent, or Firm* — Bridgeway IP Law Group, PLLC; Sang Ho Lee; Hyun Woo Shin

(57) ABSTRACT

A method for detecting a URL related to a phishing site includes: acquiring a target URL related to a first URL included in a text message; confirming whether the target URL is included in at least one among a first DB and a second DB; accessing the target URL and capturing a first web page screen, based on that the target URL is confirmed not to be included in at least one among the first DB and the second DB; and storing information related to the target URL in a result DB through the first web page screen, and acquiring information related to the target URL by inputting a plurality of types of data into a first artificial intelligence model, and storing the information related to the target URL in the result DB, based on that whether the target URL is related to a phishing site is not identified on the basis of the plurality of types of data.

10 Claims, 9 Drawing Sheets

(56) References Cited

U.S. PATENT DOCUMENTS

| | | | |
|---|---|---|---|
| 2012/0158626 A1* | 6/2012 | Zhu | G06F 21/56 726/22 |
| 2016/0006760 A1* | 1/2016 | Lala | G06F 21/51 726/23 |
| 2016/0014151 A1* | 1/2016 | Prakash | H04L 47/62 726/22 |
| 2016/0119376 A1* | 4/2016 | Scozzaro | H04L 63/1483 726/22 |
| 2018/0324201 A1* | 11/2018 | Lowry | H04L 63/1441 |
| 2019/0104154 A1* | 4/2019 | Kumar | G06N 20/00 |
| 2019/0215335 A1* | 7/2019 | Benishti | H04L 63/1441 |
| 2020/0036751 A1* | 1/2020 | Kohavi | H04L 63/1416 |
| 2020/0137110 A1* | 4/2020 | Tyler | H04L 63/1483 |
| 2020/0252428 A1* | 8/2020 | Gardezi | H04L 63/1416 |
| 2020/0314122 A1* | 10/2020 | Jones | G06F 16/51 |
| 2020/0358798 A1* | 11/2020 | Maylor | H04L 63/1433 |
| 2020/0366696 A1* | 11/2020 | Willis | H04L 63/1425 |
| 2021/0203694 A1* | 7/2021 | Paquet | H04L 63/1483 |
| 2021/0234892 A1* | 7/2021 | Narayanaswamy | H04L 63/1483 |
| 2021/0377300 A1* | 12/2021 | Devane | H04L 63/1416 |
| 2022/0329626 A1* | 10/2022 | Sambamoorthy | H04L 63/1483 |
| 2022/0368699 A1* | 11/2022 | Thomson | H04L 63/1483 |
| 2023/0106639 A1* | 4/2023 | Wagener | G06N 3/04 726/1 |
| 2023/0171212 A1* | 6/2023 | Hathaway | H04L 63/12 709/206 |
| 2023/0208876 A1* | 6/2023 | Jung | H04L 63/1441 726/23 |
| 2023/0359330 A1* | 11/2023 | Haworth | G06F 3/013 |
| 2023/0421602 A1* | 12/2023 | Boyer | G06V 30/10 |
| 2024/0187451 A1* | 6/2024 | Hwang | H04L 69/22 |
| 2024/0267395 A1* | 8/2024 | Zink | H04L 63/1425 |
| 2024/0356967 A1* | 10/2024 | Costa | G06V 10/82 |
| 2024/0372830 A1* | 11/2024 | Vörös | H04L 63/0263 |
| 2025/0007950 A1* | 1/2025 | Wuest | H04L 63/1483 |
| 2025/0023912 A1* | 1/2025 | Hu | H04L 63/1483 |

FOREIGN PATENT DOCUMENTS

| | | |
|---|---|---|
| KR | 10-2015-0054322 A | 5/2015 |
| KR | 10-2023-0059015 A | 5/2023 |
| KR | 10-2536659 B1 | 5/2023 |

* cited by examiner

```
input url = URL or text content input by user
urllong = Final destination of input URL or URL extracted from text
URL
airesponse = Result of evaluating content of corresponding site using generative AI
dnsinfor: DNS information of corresponding site
captureimg: Captured image of corresponding site
check_res: Type of corresponding site expressed in integer
         (0: Normal, 1: Malicious, 2: Highly likely to be phishing,
          3: Undetermined, 4: Harmful site, 5: Spam, 6: Adult site)
```

FIG. 4A

```
Id : ID value of this input
url : URL or text content input by user
Urllong : Final destination of input URL or URL extracted from text
Ai : Result of evaluating content of corresponding site using generative AI
Ipaddr : IP address of queried user
Dnsquery : DNS information of corresponding URL
Date : Queried date and time
AiQuery : Details of question asked to generative AI
Intype : Input type of corresponding query (Android app, Kakao Talk channel, web)
```

FIG. 4B url = URL where similarity data is stored
Ipaddr = IP address actually connected in url connection
ipcountry = Country information where IP address exists
ScriptHash = Value that stores SSDEEP hash by separately extracting only Java script part from HTML code downloaded when accessing corresponding URL.
StringHash = Value that stores SSDEEP hash by separately extracting only displayed character string part from HTML code downloaded when accessing corresponding URL.
CommentHash = Value that stores SSDEEP hash separately extracting only comment part in source code from HTML code downloaded when accessing corresponding URL.
ImageHash = Value that stores image hash for image to measure similarity of image captured when accessing corresponding URL (image hash type: average hashing, perceptual hashing, difference hashing, wavelet hashing, HSV color hashing, crop-resistant hashing)
OCTStringHash = hash for character string extracted from captured image

FIG. 4C

METHOD AND APPARATUS FOR DETECTING URL RELATED TO PHISHING SITE USING ARTIFICIAL INTELLIGENCE AND GENERATIVE AI ALGORITHM

TECHNICAL FIELD

The present disclosure relates to a phishing site detection technique, and more specifically, to a method and apparatus for detecting a uniform resource locator (URL) related to a phishing site using an artificial intelligence algorithm.

BACKGROUND ART

Phishing refers to a cybercrime that illegally collects and uses personal and financial information through fake financial sites or fake emails. With the advancement in information and communication techniques, phishing techniques are also getting more sophisticated, and the scale of damage according thereto is increasing exponentially. Various techniques are developed and introduced to prevent the phishing.

Conventionally, techniques for detecting phishing behaviors and informing communication parties of the phishing behaviors through a server connected through a communication network when a specific word included in a phishing character message is recognized are introduced.

However, as responses of victims receiving the phishing character message is inconsistent, and composition of the phishing character message is increasingly more sophisticated, there is a problem in that sufficient phishing detection and notification is not achieved with conventional techniques.

DISCLOSURE OF INVENTION

Technical Problem

Therefore, the present invention has been made in view of the above problems, and it is an object of the present invention to provide a method and apparatus for detecting a URL related to a phishing site using an artificial intelligence algorithm.

The object of the present disclosure is not limited to the object mentioned above, and unmentioned other objects and advantages of the present invention may be understood by the following description and will be more clearly understood by the embodiments of the present disclosure. In addition, it will be easily understood that the objects and advantages of the present disclosure may be realized by means and combinations thereof as indicated in the claims.

Technical Solution

To accomplish the above object, according to one aspect of the present invention, there is provided a method of detecting a uniform resource locator (URL) related to a phishing site, the method performed by an apparatus and comprising the steps of: acquiring a target URL related to a first URL included in a text message by performing a preprocessing operation on the first URL; confirming whether the target URL is included in at least one among a first database DB in which information on a plurality of phishing sites is stored and a second DB in which information on a plurality of non-phishing sites is stored; accessing the target URL and capturing a first web page screen corresponding to the target URL, based on that the target URL is confirmed not to be included in at least one among the first DB and the second DB; and storing information related to the target URL in a result DB, based on that whether the target URL is related to a phishing site is identified on the basis of a plurality of types of data acquired through the first web page screen, and acquiring information related to the target URL by inputting the plurality of types of data into a first artificial intelligence model, and storing the information related to the target URL in the result DB, based on that whether the target URL is related to a phishing site is not identified on the basis of the plurality of types of data.

In addition, the preprocessing operation on the first URL may include an operation of removing spaces included in the first URL, an operation of converting at least one special character included in the first URL into a regular character, an operation of converting lowercase letters included in the first URL into uppercase letters, an operation of removing subdirectory information from the first URL, and an operation of acquiring redirect information linked to the first URL.

In addition, the plurality of types of data may include character strings, scripts, comments, and image data extracted from the first web page screen, and based on that there exists a specific data, of which a similarity with the character string and image data extracted from the first web page screen exceeds a threshold, among a plurality of site-specific data stored in a similarity DB, whether the target URL is related to a phishing site may be identified on the basis of i) scripts and comments included in a specific site corresponding to the specific data and ii) the scripts and comments extracted from the first web page screen.

In addition, a character string on the first web page screen may be extracted by performing optical character recognition (OCR) on the first web page screen, and when the character string is not related to the scripts, comments, and image data, the target URL may be identified as being related to a phishing site.

In addition, when a specific data, of which the similarity exceeds the threshold, does not exist in the similarity DB, it may be determined that whether the target URL is related to a phishing site is not identified on the basis of the plurality of types of data, and the first artificial intelligence model may be trained, on the basis of the plurality of types of data, to output information related to the target URL including at least one among a type of a site corresponding to the target URL, a probability of the target URL for being related to a phishing site, and description of the site corresponding to the target URL output on the basis of the first web page.

In addition, based on that a text message is input from an application that executes the method of detecting a URL related to a phishing site or a chat room related to the application, information related to the target URL may be transmitted through a control user interface (UI) of the apparatus or the chat room, and based on that the target URL is related to a phishing site, access of the target URL may be blocked.

In addition, the step of storing the information related to the target URL in the result DB may further include the steps of: generating a first block on the basis of a first hash value corresponding to information related to the target URL; acquiring, based on that a website screen corresponding to the target URL changes from a first website screen to a second website screen, information indicating a difference between the first website screen and the second website screen; generating a second block on the basis of a second hash value corresponding to the acquired information indicating the difference; and connecting the second block to the first block and storing a blockchain related to the target URL in the result DB.

According to another aspect of the present invention, there is provided an apparatus for detecting a uniform resource locator (URL) related to a phishing site, the apparatus comprising: one or more memories; and one or more processors, wherein the one or more processors are set to acquire a target URL related to a first URL included in a text message by performing a preprocessing operation on the first URL, confirm whether the target URL is included in at least one among a first database DB in which information on a plurality of phishing sites is stored and a second DB in which information on a plurality of non-phishing sites is stored, access the target URL and capturing a first web page screen corresponding to the target URL, based on that the target URL is confirmed not to be included in at least one among the first DB and the second DB, and store information related to the target URL in a result DB, based on that whether the target URL is related to a phishing site is identified on the basis of a plurality of types of data acquired through the first web page screen, and acquire information related to the target URL by inputting the plurality of types of data into a first artificial intelligence model, and store the information related to the target URL in the result DB, based on that whether the target URL is related to a phishing site is not identified on the basis of the plurality of types of data.

In addition, the one or more processors may be set to generate a first block on the basis of a first hash value corresponding to information related to the target URL, acquire, based on that a website screen corresponding to the target URL changes from a first website screen to a second website screen, information indicating a difference between the first website screen and the second website screen, generate a second block on the basis of a second hash value corresponding to the acquired information indicating the difference, and connect the second block to the first block and storing a blockchain related to the target URL in the result DB.

The means for solving the above problems do not list all the features of the present disclosure. Various features of the present disclosure and advantages and effects according thereto can be understood in more detail with reference to the specific examples described below.

Advantageous Effects

According to various embodiments of the present disclosure, a method and apparatus for detecting a URL related to a phishing site using an artificial intelligence algorithm can be provided.

According to various embodiments of the present disclosure, phishing sites can be detected more efficiently by detecting whether a website is a phishing site on the basis of content on a website related to a URL, rather than simply detecting specific characters included in a character message.

The effects of the present disclosure are not limited to the effects mentioned above, and unmentioned other effects may be clearly understood by those skilled in the art from the following description.

BRIEF DESCRIPTION OF THE DRAWINGS

FIGS. 4A, 4B, and 4C are views for explaining examples of information related to a target URL and a result DB according to an embodiment of the present disclosure.

BEST MODE FOR CARRYING OUT THE INVENTION

Figure 1:
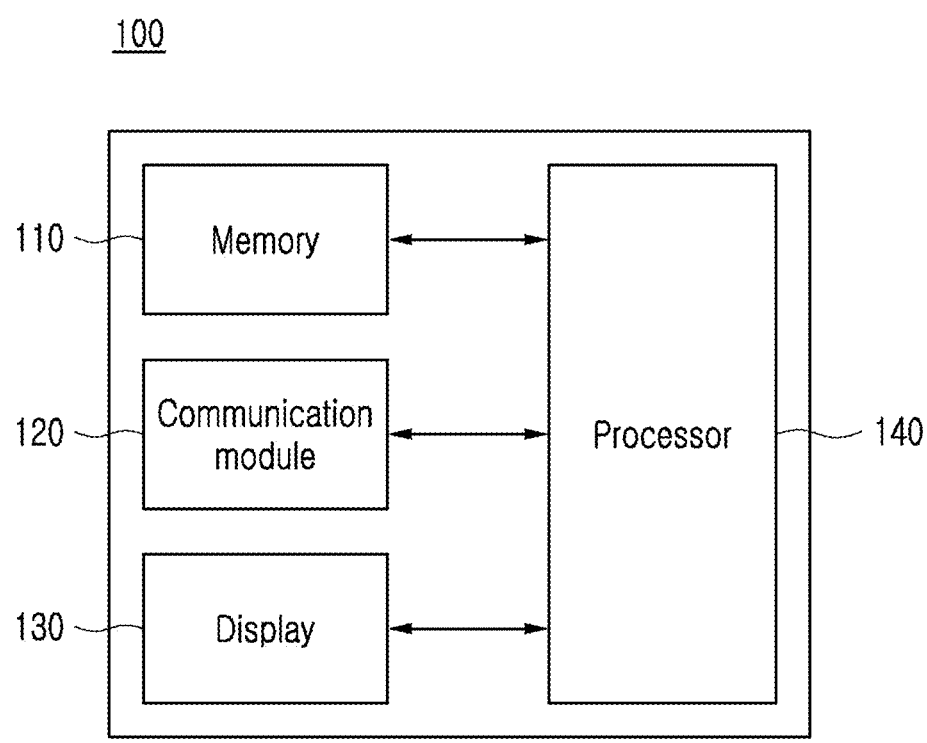
FIG. 1 is a block diagram showing the configuration of an apparatus for detecting a URL related to a phishing site according to an embodiment of the present disclosure.

The advantages and features of the present disclosure and the method for achieving them will become clear by referring to the embodiments described below in detail, together with the accompanying drawings. However, the present disclosure is not limited to the embodiments disclosed below and may be implemented in various forms different from each other. These embodiments are provided only to make the disclosure of the present disclosure complete and to fully inform those skilled in the art of the scope of the present disclosure, and the present disclosure is defined by the scope of the claims.

The terms used in this specification are to describe the embodiments and are not to limit the present disclosure. In this specification, singular forms also include plural forms unless specifically stated otherwise in the context. The terms "comprises" and/or "comprising" used in this specification do not exclude the presence or addition of one or more components other than the mentioned components.

Like reference numerals refer to like elements throughout the specification, and "and/or" includes each of the mentioned components and all combinations of one or more of the components. Although "first", "second", and the like are used to describe various components, these components are of course not limited by these terms. These terms are used only to distinguish one component from the other components. Therefore, it goes without saying that a first component mentioned below may also be a second component within the technical spirit of the present disclosure.

Unless defined otherwise, all the terms (including technical and scientific terms) used in this specification may be used as meanings that can be commonly understood by those skilled in the art. In addition, terms defined in commonly used dictionaries are not interpreted ideally or excessively unless clearly and specifically defined.

Spatially relative terms such as "below", "beneath", "lower", "above", "upper", and the like may be used to easily describe the correlation between one component and another component as shown in the drawing. The spatially relative terms should be understood as terms that include different directions of components while being used or operating, in addition to the directions shown in the drawings.

For example, when a component shown in a drawing is turned over, a component described as "below" or "beneath" another component will be placed "above" the component. Accordingly, the illustrative terms such as "below/beneath" may include both downward and upward directions. Components may also be oriented in other directions, so that the spatially relative terms may be interpreted according to the orientation.

Hereinafter, a method and apparatus for detecting a uniform resource locator (URL) related to a phishing site will be described with reference to the drawings.

FIG. 1 is a block diagram showing the configuration of an apparatus for detecting a URL related to a phishing site according to an embodiment of the present disclosure. The apparatus described in FIG. 1 may include, but are not limited to, smart phones, tablet PCs, wearable devices, laptops, and the like.

As shown in FIG. 1, the apparatus 100 may include a memory 110, a communication module 120, a display 130, and a processor 140. However, it is not limited thereto, and software and hardware configurations of the apparatus 100 may be modified, added, or omitted according to required operations within a range apparent to those skilled in the art.

The memory 110 may store data supporting various functions of the apparatus 100 and programs for the operation of a control unit, store input/output data (e.g., various databases (DB), information related to an input URL, and the like), and store a plurality of application programs (applications) executed in the apparatus, and data and commands for the operation of the apparatus. At least some of the application programs may be downloaded from an external device through wireless communication.

The memory 110 may include a memory (e.g., SD or XD memory or the like) of a flash memory type, a hard disk type, a Solid-State Disk (SSD) type, a Silicon Disk Drive type (SDD) type, a multimedia card micro type, or a card type, and at least one type of storage medium among random access memory (RAM), static random-access memory (SRAM), read-only memory (ROM), electrically erasable programmable read-only memory (EEPROM), programmable read-only memory (PROM), magnetic memory, magnetic disks, and optical disks. In addition, although the memory 110 is separate from the apparatus, it may be a database connected by wire or wirelessly.

The communication module 120 may include one or more components that allow communication with external devices. For example, the communication module 120 may include at least one among a wireless communication module, a wired communication module, and a location information module.

For example, the communication module 120 may receive information on a plurality of URLs inspected for being a phishing site and a result of phishing site inspection conducted on corresponding URLs from another apparatus.

Here, the wireless communication module may include a wireless communication module that supports various wireless communication methods such as Global System for Mobile Communication (GSM), Code Division Multiple Access (CDMA), Wideband Code Division Multiple Access (WCDMA), universal mobile telecommunications system (UMTS), Time Division Multiple Access (TDMA), Long Term Evolution (LTE), 4G, 5G, and 6G, in addition to a Wi-Fi module and a Wireless Broadband (Wi-Bro) module.

The display 130 displays (outputs) information processed by the apparatus 100 (e.g., information related to a URL included in a text message, and the like). For example, the display may display information on the execution screen of an application program (e.g., application) executed in the apparatus 100, or User Interface (UI) and Graphic User Interface (GUI) information according to the information on the execution screen.

The processor 140 may be implemented as a memory that stores data about an algorithm for controlling the operation of the components in the apparatus 100 or a program that reproduces the algorithm, and at least one processor (not shown) that performs the operations described above using the data stored in the memory. At this point, the memory and the processor may be implemented as separate chips. Alternatively, the memory and the processor may be implemented as single chips.

That is, the processor 140 may control the overall operation and functions of the apparatus 100 by controlling the components in the apparatus 100. The processor may control any one or a combination of the components described above in order to implement various embodiments according to the present disclosure described below in the drawings on the apparatus.

Figure 2:
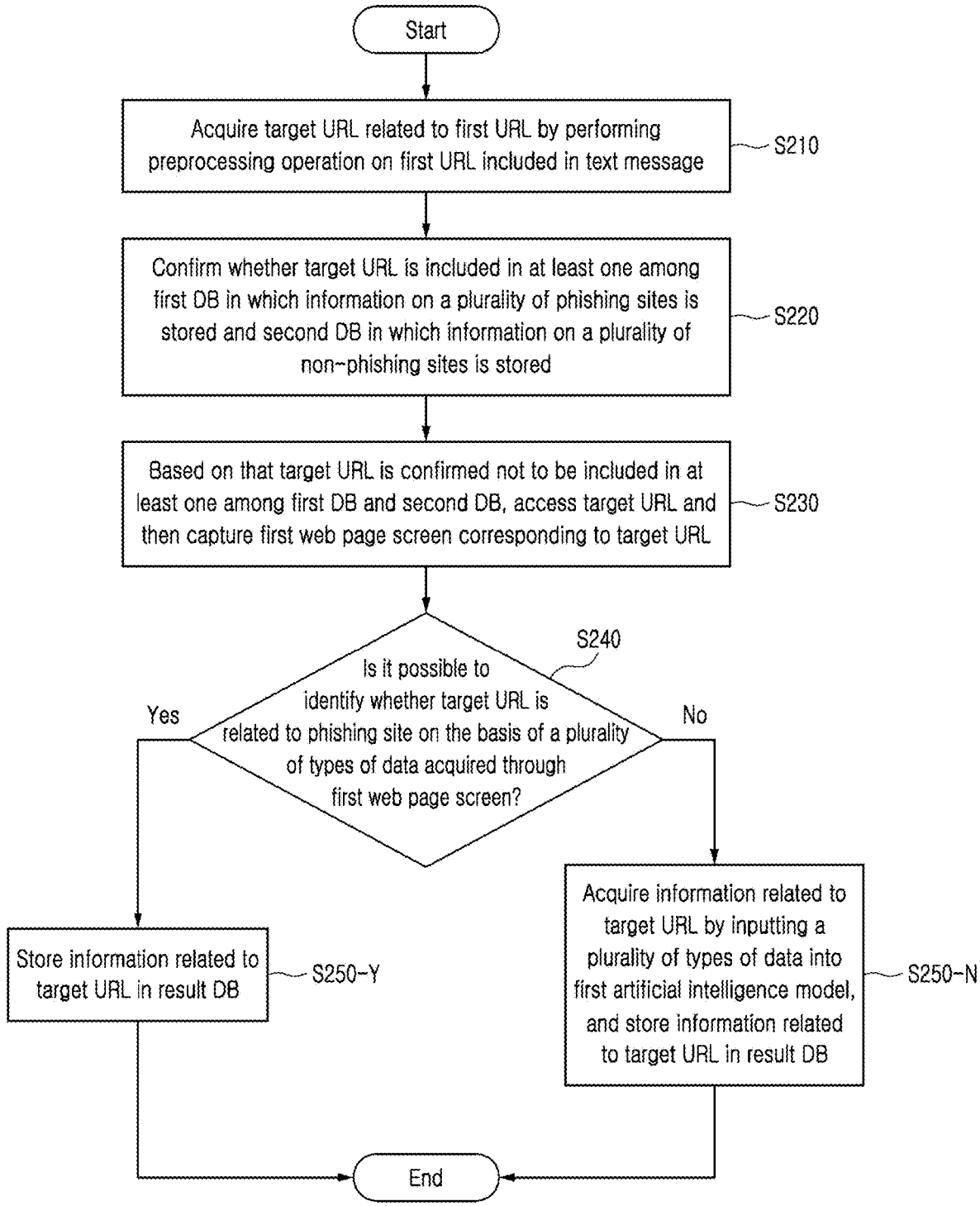
FIG. 2 is a flowchart illustrating a method of detecting a URL related to a phishing site according to an embodiment of the present disclosure.

FIG. 2 is a flowchart illustrating a method of detecting a URL related to a phishing site according to an embodiment of the present disclosure. The apparatus may perform the operation of the apparatus described in FIG. 2 through an application and/or a website related to the method of detecting a URL related to a phishing site.

Additionally or alternatively, the apparatus may perform the operation described in FIG. 2 using a server that stores a database for detecting URLs related to a phishing site.

The apparatus may acquire a target URL related to a first URL included in a text message by performing a preprocessing operation on the first URL (S210).

Here, the text message may include a character message, a message transmitted through an instant messaging application, a message transmitted through a quick panel and/or a pop-up window, and the like. However, this is only an example, and the text message may include messages input or transmitted through various media.

The apparatus may detect and extract a first URL included in the text message and perform a preprocessing operation on the first URL.

For example, the preprocessing operation on the first URL may include an operation of removing spaces included in the first URL, an operation of converting at least one special character included in the first URL into a regular character, an operation of converting lowercase letters included in the first URL into uppercase letters, an operation of removing subdirectory information from the first URL, an operation of acquiring redirect information linked to the first URL, and the like.

Specifically, first, the apparatus may process special characters such as newline characters, TAB characters, and the like included in the first URL as blanks. The apparatus may convert specific characters included in the first URL into characters of a similar form (for example, convert "(" into "C"). The apparatus may convert predefined special characters into regular characters (e.g., convert "®" into "R").

In addition, the apparatus may extract only the pure URL part from the first URL by excluding subdirectories. The apparatus may convert uppercase letters included in the extracted URL part into lowercase letters. The apparatus may request head information of the extracted URL part. For example, when the "Status_code" is 200, the apparatus may acquire a target URL redirected from the first URL through "Response.headers[Location]" information. That is, the target URL means an actual URL that can be accessed as the first URL is input or selected.

Additionally or alternatively, the apparatus may acquire a target URL by automatically recognizing malicious code cases using scripts uploaded to a specific site.

For example, when the first URL is "www.abcd.com?redirect=www.defg.com", the apparatus may identify that the target URL corresponding to the first URL is www.defg.com by automatically recognizing a malicious code case.

The apparatus may confirm whether the target URL is included in at least one among a first DB in which information on a plurality of phishing sites is stored and a second DB (e.g., white DB) in which information on a plurality of non-phishing sites is stored (S220).

Here, the first DB may include a list including a plurality of phishing sites, at least one URL related to a corresponding phishing site, and the like. When the target URL acquired by performing a preprocessing operation on the first URL is included in the first DB, the apparatus may determine that the first URL is related to a phishing site.

For example, when the URL acquired by converting special characters included in the first URL into regular characters is included in the first DB, the apparatus may determine that the first URL is related to a phishing site. The apparatus may determine whether the first URL is related to a phishing site by determining whether the acquired URL is included in the first DB whenever it performs a preprocessing operation.

The second DB may include a list including a plurality of non-phishing sites, at least one URL related to a corresponding non-phishing site, and the like. When the target URL acquired by performing a preprocessing operation on the first URL is included in the second DB, the apparatus may determine that the first URL is not related to a phishing site.

The apparatus may determine whether the first URL is related to a phishing site by determining whether the acquired URL is included in the second DB whenever it performs a preprocessing operation.

Based on that the target URL is confirmed not to be included in at least one among the first DB and the second DB, the apparatus may access the target URL and capture a first web page screen corresponding to the target URL (S230).

That is, the apparatus may acquire the first web page screen by accessing the finally acquired target URL address. Additionally or alternatively, the apparatus may acquire information on the domain name system (DNS) of the target URL.

The apparatus may extract and acquire a plurality of types of data (e.g., tags, scripts, plain text, comments, image data, and the like) from the first web page screen.

Here, when a script included in the first web page screen is obfuscated or encrypted, the apparatus may perform decryption on the script. Additionally or alternatively, the apparatus may acquire information on the script by applying an algorithm such as the JavaScript emulator or the like to the script included in the first web page screen.

The apparatus may identify whether the target URL is related to a phishing site on the basis of a plurality of types of data acquired through the first web page screen (S240).

As an example of the present disclosure, based on that whether the target URL is related to a phishing site is identified on the basis of a plurality of types of data acquired through the first web page screen, the apparatus may store information related to the target URL in a result DB (S250-Y).

Here, the information related to the target URL may include a text message including the target URL, a type of a site corresponding to the target URL, image data of a website screen corresponding to the target URL, a probability of the target URL for being related to a phishing site, description of a site corresponding to the target URL output on the basis of the first web page, and the like.

A similarity DB means a database that stores tags, scripts, plain text, comments, and image data included in a plurality of URL addresses. The apparatus may acquire a similarity between a plurality of types of data extracted from the first website screen and data stored in the similarity DB. The apparatus may identify whether a specific URL is related to a phishing site using a specific data, of which the similarity exceeds a threshold, among the data stored in the similarity DB.

Based on that there exists a specific data, of which the similarity with the character string and image data extracted from the first web page screen exceeds a threshold, among a plurality of site-specific data stored in the similarity DB, the apparatus may identify whether the target URL is related to a phishing site on the basis of i) scripts and comments included in a specific site corresponding to the specific data and ii) the scripts and comments extracted from the first web page screen.

The process of identifying whether the target URL is related to a phishing site on the basis of a plurality of types of data using the similarity DB by the apparatus will be described in detail with reference to FIG. 3.

As another example of the present disclosure, based on that whether the target URL is related to a phishing site is not identified on the basis of the plurality of types of data, the apparatus may acquire information related to the target URL by inputting the plurality of types of data into a first artificial intelligence model, and store the information related to the target URL in the result DB (S250-N).

Here, the fact that whether the target URL is related to a phishing site is not identified on the basis of a plurality of types of data may mean that data related to a plurality of types of data does not exist in the similarity DB. When information related to the target URL is not acquired through the similarity DB, the apparatus may acquire information related to the target URL by inputting a plurality of types of data into the first artificial intelligence model.

Here, the first artificial intelligence model may be trained, on the basis of the plurality of types of data, to output at least one among a type of a site corresponding to the target URL, a probability of the target URL for being related to a phishing site, and description of a site corresponding to the target URL output on the basis of the first web page.

For example, the first artificial intelligence model may include one or more neural networks for performing generative artificial intelligence operations, but it is not limited thereto.

The apparatus may construct a result DB on the basis of information related to the target URL. The types of various data constructed in the result DB will be described in detail with reference to FIGS. 4A to 4C.

As an additional example of the present disclosure, when a character string extracted through OCR is different from the text, scripts, comments, or image data extracted from the first website, this may be regarded that a separate character string is inserted on the first website screen to deceive a user.

Accordingly, the apparatus may extract a character string on the first web page screen as one of a plurality of types of data by performing optical character recognition (OCR) on the first web page screen. When the character string extracted from the first web page screen is not related to the scripts, comments, and image data extracted from the first website, the apparatus may identify that the target URL is related to a phishing site.

As an additional example of the present disclosure, based on that a text message is input from an application that executes the method of detecting a URL related to a phishing site or a chat room related to the application, the apparatus may transmit information related to the target URL through a control user interface (UI) (e.g., quick panel or the like) of the apparatus or the chat room. In addition, when the target URL is identified as being related to a phishing site, the apparatus may block access of the target URL.

As an additional example of the present disclosure, the apparatus may construct a result DB on the basis of blockchain. Accordingly, URL information related to phishing sites may be stored and managed more safely and efficiently.

Specifically, the apparatus may generate a first block on the basis of a first hash value corresponding to information related to the target URL. Here, the block means a bunch of valid information and may include a block hash value that functions as an identifier of the block, a hash value of a previous block, a Merkle root, transaction information, and the like.

The apparatus may monitor whether a website screen corresponding to the target URL changes to another screen. Based on that a first website screen changes to a second website screen (i.e., the configuration of the first website screen changes, or the like), the apparatus may acquire information indicating the difference between the first website screen and the second website screen. The apparatus may generate a second block on the basis of a second hash value corresponding to the acquired information indicating the identified difference. The apparatus may connect the second block to the first block and store a blockchain related to the target URL in the result DB.

Figure 3:
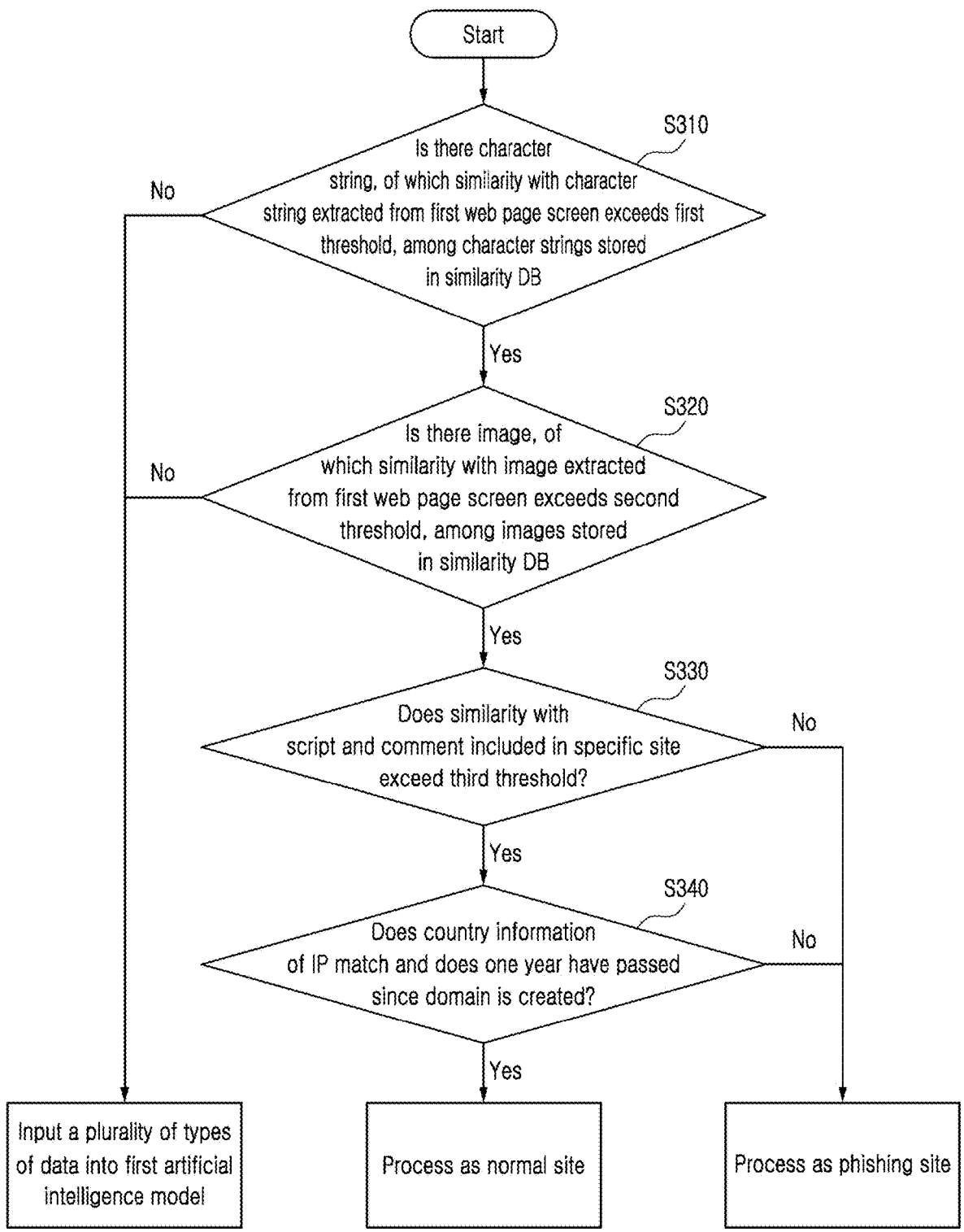
FIG. 3 is a flowchart illustrating a method of identifying whether a target URL is related to a phishing site on the basis of a similarity DB according to an embodiment of the present disclosure.

FIG. 3 is a flowchart illustrating a method of identifying whether a target URL is related to a phishing site on the basis of a similarity DB according to an embodiment of the present disclosure.

The apparatus may identify whether there is a character string, of which the similarity with the character string extracted from the first web page screen exceeds a first threshold, among the character strings stored in the similarity DB (S310).

Specifically, the apparatus may acquire an SSDEEP hash value for the character string extracted from the first web page screen. The apparatus may acquire a similarity between the acquired SSDEEP hash value for the character string and an SSDEEP hash value for a plurality of character strings stored in the similarity DB. Accordingly, the apparatus may identify whether there is a character string, of which the similarity with the character string extracted from the first web page screen exceeds the first threshold, among the character strings stored in the similarity DB.

When a character string, of which the similarity with the character string extracted from the first web page screen exceeds the first threshold, does not exist in the similarity DB, the apparatus may determine that whether the target URL is related to a phishing site is not identified on the basis of a plurality of types of data. Then, the apparatus may input the plurality of types of data into the first artificial intelligence model.

It is assumed that there is a character string, of which the similarity with the character string extracted from the first web page screen exceeds the first threshold, in the similarity DB. At this point, the apparatus may identify whether there is an image, of which the similarity with the image extracted from the first web page screen exceeds a second threshold, among the images stored in the similarity DB (S320).

The apparatus may acquire a hash value for the image extracted from the first web page screen. The apparatus may acquire the similarity between the hash value acquired for the image and a hash value for a plurality of images stored in the similarity DB. Accordingly, the apparatus may identify whether there is an image, of which the similarity with the image extracted from the first web page screen exceeds the second threshold, among the images stored in the similarity DB.

When an image, of which the similarity with the image extracted from the first web page screen exceeds the second threshold, does not exist in the similarity DB, the apparatus may determine that whether the target URL is related to a phishing site is not identified on the basis of a plurality of types of data. In addition, the apparatus may input the plurality of types of data into the first artificial intelligence model.

It is assumed that there are a specific character string and a specific image, of which the similarity with the character string and image extracted from the first web page screen exceeds a threshold, in the image DB. The apparatus may identify scripts and comments included in a specific site related to the specific character string and the specific image.

The apparatus may identify whether the similarity between the scripts and comments extracted from the first web page screen and the scripts and comments included in the specific site exceeds a third threshold (S330).

When the similarity between the scripts and comments extracted from the first web page screen and the scripts and comments included in the specific site does not exceed the third threshold, the apparatus may identify that the target URL is related to a phishing site.

It is assumed that the similarity between the scripts and comments extracted from the first web page screen and the scripts and comments included in the specific site exceeds the third threshold. At this point, the apparatus may confirm whether the country information of the IP of a site related to the target URL matches the country information of the IP of a specific site and whether one year has passed since the domain of the site related to the target URL is created (S340).

When the country information of the IP of a site related to the target URL matches the country information of the IP of the specific site, and one year has passed since the domain of the site related to the target URL is created, the apparatus may identify the site related to the target URL as a normal site.

When the country information of the IP of a site related to the target URL does not match the country information of the IP of the specific site, or one year has not passed since the domain of the site related to the target URL is created, the apparatus may identify that the target URL is related to a phishing site.

Additionally or alternatively, the procedures and operations described with reference to FIG. 3 may be performed through a second AI model.

Specifically, the second AI model may be trained to output, when the character strings, images, scripts, and comments extracted from the first web page screen are input as input data, information on whether the input data (i.e., a plurality of types of data) should be input into the first AI model or whether the target URL is related to a normal or phishing site. That is, the second AI model may be trained to perform an operation according to steps S310 to S340 on the basis of the input data described above.

FIGS. 4A to 4C are views for explaining examples of information related to a target URL and a result DB according to an embodiment of the present disclosure.

FIG. 4A is a view showing an example of information related to a target URL that the apparatus outputs. Information related to a target URL may include text message content including a first URL, the target URL, output data of the first artificial intelligence model (when data is input into the first artificial intelligence model), DNS information related to the target URL, a type of a site related to the target URL, and the like.

FIG. 4B is a view showing an example of a result DB constructed on the basis of information related to the target URL.

For example, the result DB may include the ID of information related to the target URL, text message content including a first URL, the target URL, output data of the first artificial intelligence model (when data is input into the first artificial intelligence model), the IP address of a user (i.e., apparatus), DNS information related to the target URL, an input type of a query related to the target URL, and the like.

FIG. 4C is a view showing an example of information related to a target URL stored in the similarity DB or the like.

For example, information related to a target URL stored in the similarity DB or the like may include the target URL, an IP address actually connected when accessing the target URL, information on a country in which the IP address exists, a value storing a SSDEEP hash by extracting only the JavaScript part from an HTML code downloaded when accessing the target URL, a value storing a SSDEEP hash by separately extracting only the displayed string part from an HTML code downloaded when accessing the target URL, a value storing a SSDEEP hash by separately extracting only the comment part in the source code from an HTML code downloaded when accessing the target URL, a value storing an image hash for an image captured when accessing the target URL to measure the similarity of the image, a hash value for a character string extracted from the captured image, and the like.

FIGS. 5A to 5D are views for explaining a process of outputting information related to a target URL according to an embodiment of the present disclosure.

Figure 5A:
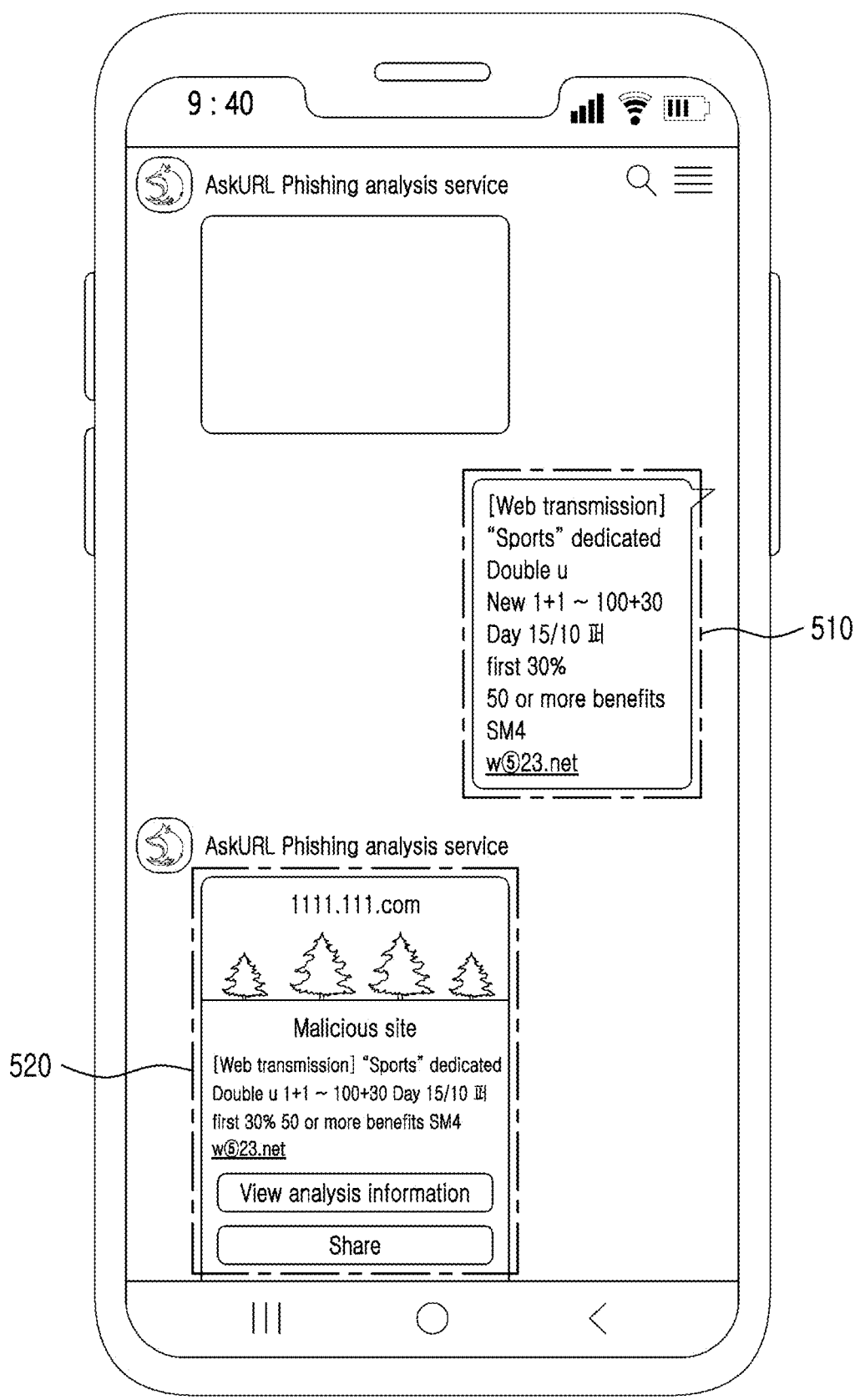
FIGS. 5A, 5B, 5C, and 5D are views for explaining a process of outputting information related to a target URL according to an embodiment of the present disclosure.

As an example of the present disclosure, as shown in FIG. 5A, a text message 510 including a first URL may be copied and input into a chat room related to an application executing the method of detecting a URL related to a phishing site. The apparatus may acquire information related to the target URL corresponding to the first URL according to the method described in FIGS. 1 to 4C, and output information 520 that allows accessing the acquired information related to the target URL through the chat room.

Figure 5B:
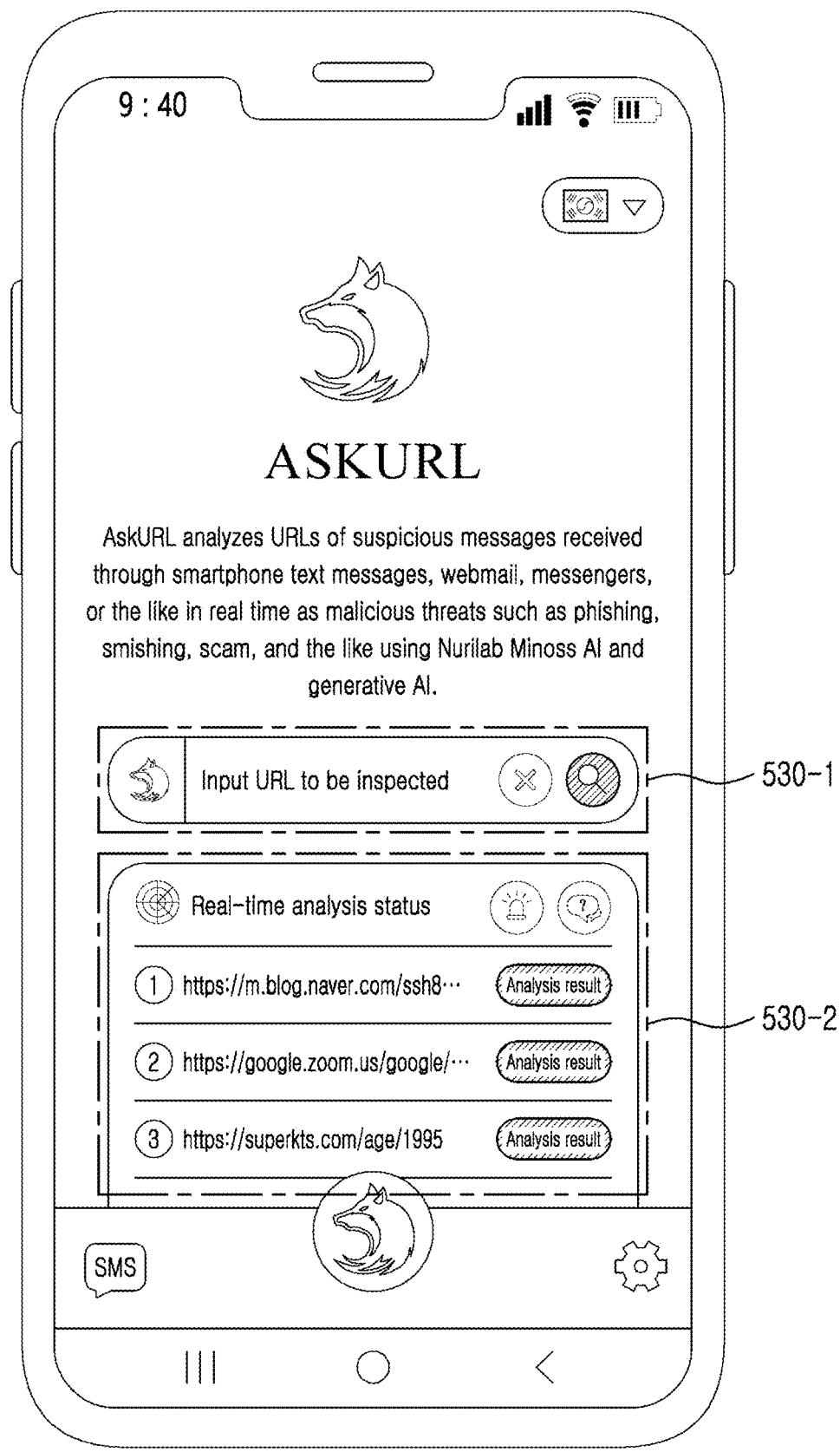

As another example of the present disclosure, as shown in FIG. 5B, the first URL may be input into the input window 530-1 on an application executing the method of detecting a URL related to a phishing site. At this point, the apparatus may display a URL list 530-2, which has been inspected by another apparatus whether the URLs are related to a phishing site, in an area of the application. When one among a plurality of URLs included in the URL list 530-2 is selected, the apparatus may provide a result of inspecting the selected URL.

Figure 5C:
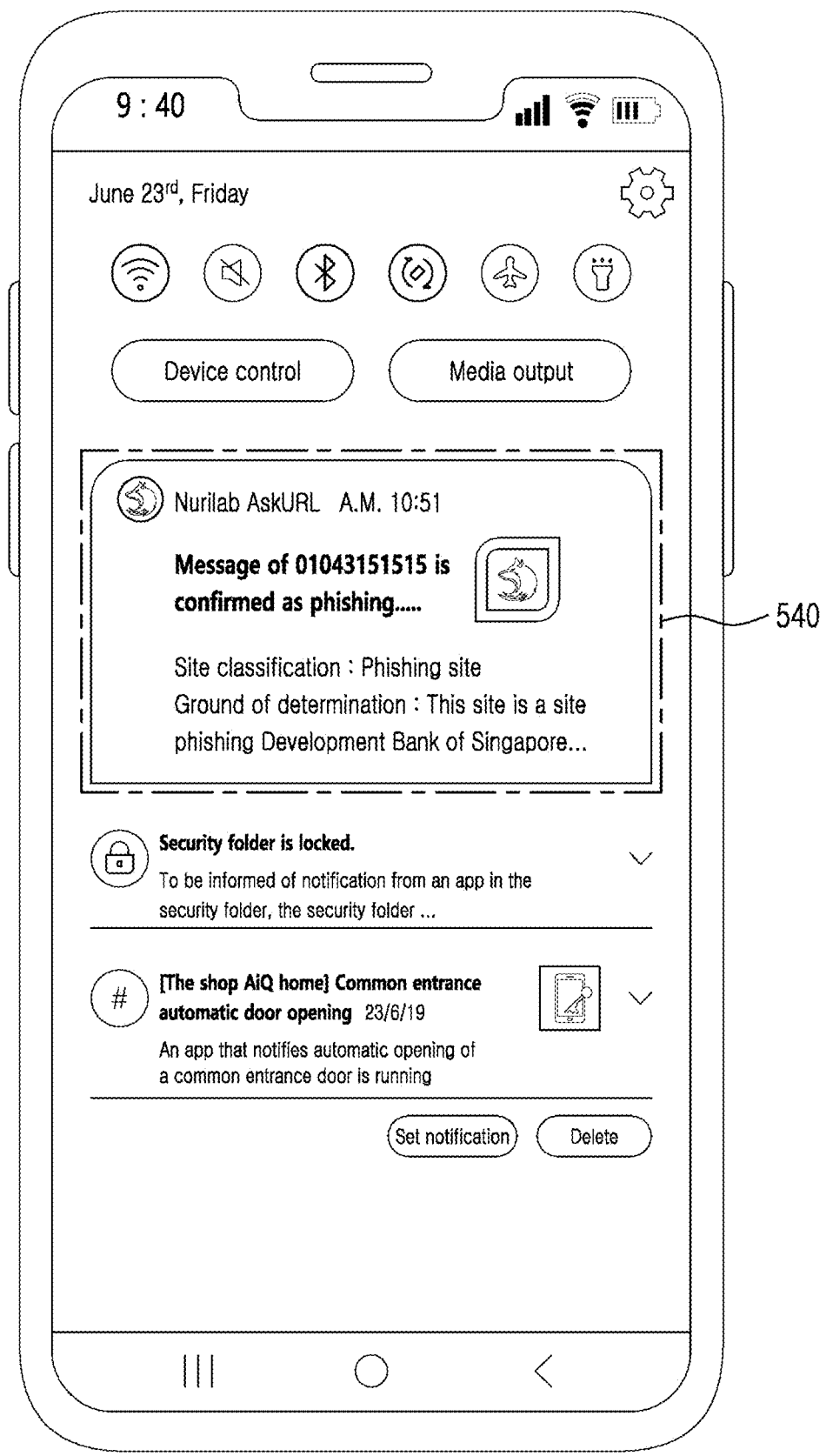

The apparatus may acquire information related to a target URL corresponding to the first URL according to the method described in FIGS. 1 to 4C. For example, as shown in FIG. 5C, the apparatus may output information 540 that allows accessing the acquired information related to the target URL through a control UI (e.g., quick panel).

Figure 5D:
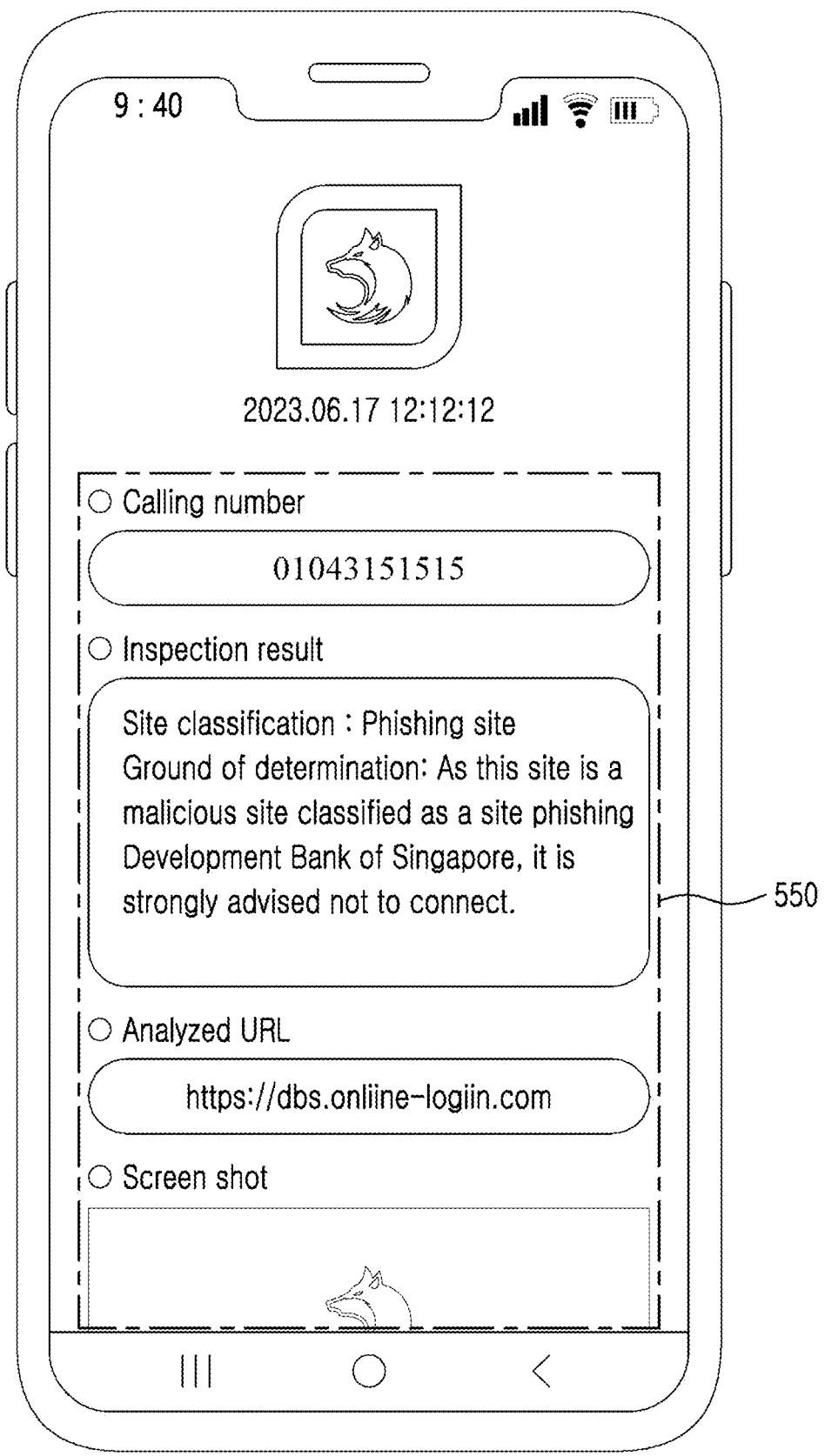

As another example, as shown in FIG. 5D, the acquired information related to the target URL (e.g., information indicating whether the target URL is related to a phishing site, the first website screen of the target URL, and the like) may be output through a separate application screen 550.

The embodiments described in the present disclosure and the accompanying drawings only illustrate some of the technical spirit included in the present disclosure as an example. Accordingly, the embodiments disclosed in this specification are not intended to explain, not to limit, the technical spirit of the present disclosure, and therefore, it is apparent that the scope of the technical spirit of the present invention is not limited by these embodiments.

All modified examples and specific embodiments that can be easily inferred by those skilled in the art within the scope of the technical spirits included in the specification and drawings of the present disclosure should be construed as being included in the scope of the present disclosure.

DESCRIPTION OF SYMBOLS

100: Apparatus
110: Memory
120: Communication module
130: Display

The invention claimed is:

1. A method of detecting a uniform resource locator (URL) related to a phishing site, the method performed by an apparatus and comprising:
   acquiring a target URL related to a first URL included in a text message by performing a preprocessing operation on the first URL;
   confirming whether the target URL is included in at least one among a first database (DB) in which information on a plurality of phishing sites is stored and a second DB in which information on a plurality of non-phishing sites is stored;
   accessing the target URL and capturing a first web page screen corresponding to the target URL, based on the confirmation that the target URL is not included in at least one among the first DB and the second DB; and
   storing information related to the target URL in a result DB, wherein the storing the information related to the target URL comprises when the target URL is identified as being related to a phishing site based on a plurality of types of data acquired through the first web page screen, storing the information related to the target URL in the result DB, and when the target URL is not identified as being related to the phishing site based on the plurality of types of data, acquiring the information related to the target URL by inputting the plurality of types of data into a first artificial intelligence model, and storing the information related to the target URL in the result DB,
   wherein the storing the information related to the target URL in the result DB further comprises:
      generating a first block based on a first hash value corresponding to the information related to the target URL;
      acquiring, based on a change in a website screen corresponding to the target URL from a first website screen to a second website screen, information indicating a difference between the first website screen and the second website screen;
      generating a second block based on a second hash value corresponding to the acquired information indicating the difference; and
      connecting the second block to the first block and storing the first and second blocks related to the target URL in the result DB constructed on a basis of blockchain,
   wherein based on the text message being input from an application that executes the method of detecting the URL related to the phishing site related to the application, the information related to the target URL is transmitted through a control user interface (UI) of the apparatus, and wherein based on the target URL being related to the phishing site, access of the target URL is blocked.

2. The method according to claim 1, wherein the preprocessing operation on the first URL comprises an operation of removing spaces included in the first URL, an operation of converting at least one special character included in the first URL into a regular character, an operation of converting lowercase letters included in the first URL into uppercase letters, an operation of removing subdirectory information from the first URL, and an operation of acquiring redirect information linked to the first URL.

3. The method according to claim 1, wherein the plurality of types of data comprises character strings, scripts, comments, and image data extracted from the first web page screen, and wherein, based on whether a specific data, of which a similarity with the character strings and image data extracted from the first web page screen exceeds threshold values, exists among a plurality of site-specific data stored in a similarity DB, whether the target URL is related to the phishing site is identified on the basis of i) scripts and comments included in a specific site corresponding to the specific data and ii) the scripts and the comments extracted from the first web page screen.

4. The method according to claim 3, wherein the character strings on the first web page screen are extracted by performing optical character recognition (OCR) on the first web page screen, and when the character strings are not related to the scripts, the comments, and the image data, the target URL is identified as being related to the phishing site.

5. The method according to claim 3, wherein when the specific data, of which the similarity exceeds the threshold values, does not exist in the similarity DB, the apparatus determines that the target URL is not related to the phishing site based on the plurality of types of data, and wherein the first artificial intelligence model is trained, based on the plurality of types of data, to output the information related to the target URL including at least one among a type of a site corresponding to the target URL, a probability of the target URL for being related to the phishing site, and description of the site corresponding to the target URL output based on the first web page.

6. An apparatus for detecting a uniform resource locator (URL) related to a phishing site, the apparatus comprising:

one or more memories; and one or more processors, wherein the one or more processors are configured to:

acquire a target URL related to a first URL included in a text message by performing a preprocessing operation on the first URL;

confirm whether the target URL is included in at least one among a first database (DB) in which information on a plurality of phishing sites is stored and a second DB in which information on a plurality of non-phishing sites is stored;

access the target URL and capture a first web page screen corresponding to the target URL, based on the confirmation that the target URL is not included in at least one among the first DB and the second DB; and when the target URL is identified as being related to a phishing site based on a plurality of types of data acquired through the first web page screen, store information related to the target URL in a result DB, and when the target URL is not identified as being related to the phishing site based on the plurality of types of data, acquire the information related to the target URL by inputting the plurality of types of data into a first artificial intelligence model, and store the information related to the target URL in the result DB, wherein the one or more processors are further configured to:

generate a first block based on a first hash value corresponding to the information related to the target URL;

acquire, based on a change in a website screen corresponding to the target URL from a first website screen to a second website screen, information indicating a difference between the first website screen and the second website screen;

generate a second block based on a second hash value corresponding to the acquired information indicating the difference; and connect the second block to the first block and store the first and second blocks related to the target URL in the result DB constructed on a basis of blockchain, wherein based on the text message being input from an application that executes detecting the URL related to the phishing site related to the application, the information related to the target URL is transmitted through a control user interface (UI) of the apparatus, and wherein based on that the target URL being related to the phishing site, access of the target URL is blocked.

7. The apparatus according to claim 6, wherein the preprocessing operation on the first URL comprises an operation of removing spaces included in the first URL, an operation of converting at least one special character included in the first URL into a regular character, an operation of converting lowercase letters included in the first URL into uppercase letters, an operation of removing subdirectory information from the first URL, and an operation of acquiring redirect information linked to the first URL.

8. The apparatus according to claim 7, wherein the plurality of types of data comprises character strings, scripts, comments, and image data extracted from the first web page screen, and wherein, based on whether a specific data, of which a similarity with the character sting strings and image data extracted from the first web page screen exceeds threshold values, exists among a plurality of site-specific data stored in a similarity DB, whether the target URL is related to the phishing site is identified on the basis of i) scripts and comments included in a specific site corresponding to the specific data and ii) the scripts and the comments extracted from the first web page screen.

9. The apparatus according to claim 8, wherein the character strings on the first web page screen are extracted by performing optical character recognition (OCR) on the first web page screen, and when the character strings are not related to the scripts, the comments, and the image data, the target URL is identified as being related to the phishing site.

10. The apparatus according to claim 8, wherein when the specific data, of which the similarity exceeds the threshold values, does not exist in the similarity DB, the one or more processors are configured to determine that the target URL is not related to the phishing site based on the plurality of types of data, and wherein the first artificial intelligence model is trained, based on the plurality of types of data, to output the information related to the target URL including at least one among a type of a site corresponding to the target URL, a probability of the target URL for being related to the phishing site, and description of the site corresponding to the target URL output based on the first web page.

* * * * *